(12) United States Patent
Saxena

(10) Patent No.: US 10,994,994 B2
(45) Date of Patent: May 4, 2021

(54) METHOD OF PRODUCING HYDROGEN GAS FROM WATER

(71) Applicant: Surendra Saxena, Miami, FL (US)

(72) Inventor: Surendra Saxena, Miami, FL (US)

( * ) Notice: Subject to any disclaimer, the term of this patent is extended or adjusted under 35 U.S.C. 154(b) by 23 days.

(21) Appl. No.: 16/349,555

(22) PCT Filed: Apr. 10, 2019

(86) PCT No.: PCT/IB2019/052933
§ 371 (c)(1),
(2) Date: May 13, 2019

(87) PCT Pub. No.: WO2020/115568
PCT Pub. Date: Jun. 11, 2020

(65) Prior Publication Data
US 2020/0262702 A1 Aug. 20, 2020

Related U.S. Application Data

(60) Provisional application No. 62/725,440, filed on Aug. 31, 2018.

(30) Foreign Application Priority Data

Dec. 4, 2018 (IN) .............................. 201841045714

(51) Int. Cl.
C01B 3/10 (2006.01)
C01B 3/04 (2006.01)
(Continued)

(52) U.S. Cl.
CPC ............... *C01B 3/10* (2013.01); *B01J 8/1881* (2013.01); *C01B 3/045* (2013.01); *C01B 3/061* (2013.01);
(Continued)

(58) Field of Classification Search
CPC C01B 3/10; C01B 3/065; C01B 13/20; C01B 3/045; C01B 3/061;
(Continued)

(56) References Cited

U.S. PATENT DOCUMENTS 7,892,521 B2 * 2/2011 Saxena ..................... B01J 7/02
 252/188.25
9,233,847 B2 1/2016 Brown et al.
(Continued)

OTHER PUBLICATIONS

Solid Oxide Membrane Process for Magnesium Production Directly from Magnesium Oxide, A. Krishnan, X.G. Lu and U.B. Pal, Metallurgical and Materials Transactions B, vol. 36B, Aug. 2005-463.
(Continued)

*Primary Examiner* — Anthony J Zimmer
*Assistant Examiner* — Syed T Iqbal
(74) *Attorney, Agent, or Firm* — William Gray Mitchell

(57) ABSTRACT

The invention is a method for coproducing Hydrogen and certain metals by reducing a metal oxide(s) with $MgH_2$ or with metal and water, wherein the non-water oxides used in the method include $SiO_2$, $Cr_2O_3$, $TiO_2$, $SnO_2$, $ZrO_2$, $CuO$, $ZnO$, $WO_3$, $Ta_2O_5$, $Cs_2Cr_2O_7$ or $CsOH$. The method reacts the $MgH_2$ with a metal oxide or directly uses metal and water instead of a hydride, and initiates a reaction with the metal oxide. The reaction releases Hydrogen and reduces the subject oxide to metal.

7 Claims, 2 Drawing Sheets

(51) Int. Cl.
*C01B 3/06* (2006.01)
*C01B 13/20* (2006.01)
*C01F 5/06* (2006.01)
*B01J 8/18* (2006.01)

(52) U.S. Cl.
CPC .............. *C01B 3/065* (2013.01); *C01B 13/20* (2013.01); *C01F 5/06* (2013.01); *C01B 2203/0405* (2013.01)

(58) Field of Classification Search
CPC .............. C01B 2203/0405; C01B 6/04; C01B 2203/0465; C01B 2203/0475; C01B 2203/86; C01B 3/02; C01B 3/50; C01F 5/06; B01J 8/1881; B01J 7/02; Y02E 60/362; Y02E 10/46; Y02E 60/142; Y02E 60/56; Y02E 70/30; Y02P 20/134; Y02P 20/124; Y02P 30/30; C01D 7/07; F24S 60/00; F28D 20/003; H01M 2250/40; H01M 8/065; Y02B 10/20

See application file for complete search history.

(56) References Cited

U.S. PATENT DOCUMENTS

| | | |
|---|---|---|
| 2001/0022960 A1 | 9/2001 | Kojima et al. |
| 2009/0202413 A1 | 8/2009 | Saxena |
| 2016/0108497 A1* | 4/2016 | Fang .......................... B22F 9/20 75/743 |

OTHER PUBLICATIONS

Commentary: Producing industrial hydrogen from renewable energy, Cedric Philibert, www.iea.org/newsroom/news/2017/april/producing-industrial-hydrogen-from-renewable-energy.html, Apr. 18, 2017.

* cited by examiner

METHOD OF PRODUCING HYDROGEN GAS FROM WATER

CROSS REFERENCE TO RELATED APPLICATIONS

This patent application claims priority to U.S. Provisional Patent Application 62/725,440 filed Aug. 31, 2018, Indian Patent Application 201841045714, filed Dec. 4, 2018 and International Patent Application PCT/IB2019/052933 filed Apr. 10, 2019.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a method of producing hydrogen gas from water.

Background of the Invention

Hydrogen is a very important source of energy in today's world. Its production, storage and transportation constitute an important branch of study and research. Many path-breaking industrial processes have been devised and attempted to undertake profitable production of hydrogen from various sources. Further, many of the known methods of producing hydrogen result in carbon emission due to use of fossil fuels.

The current industrial method of hydrogen production produces hydrogen at a price comparable to that of gasoline. The industrial method uses the Steam Methane Reformation (SMR) technique as mentioned in U.S. Pat. No. 9,233,847 to Brown et al., which technique is based on reacting natural gas (mostly methane) with water for Hydrogen production. The SMR technique generates 8.1 tons of $CO_2$ for each single ton of hydrogen that is produced, thus contributing to the problem of global warming. The production cost works to about US$1.65/kg of Hydrogen. This low production cost is partly due to oil production methods requiring the fracturing of oil shales and driving out the contained hydrocarbons with $CO_2$, which is called fracking. Fracking can be a very destructive process, often causing mini-earthquakes.

The electrolysis of water is another method which produces hydrogen with little or no direct carbon emission, but the method is very energy intensive and, assuming this energy consumed comes from fossil fuel, thus still causes air pollution. C. Philbert (2017) Commentary titled "Producing industrial hydrogen from renewable Energy". Further, reference "Gerlach, A.-K et al. (2011), PV and wind power complementary technologies, 26th European Photovoltaic Solar Energy Conference Hamburg (GE), 5-9 September" discloses one such process wherein price for a kilogram of $H_2$ could be as low as $3.00 per kilogram using electrolysis of water.

U.S. Pat. No. 7,892,521B2 to Saxena entitled "Synthesis and use of metal hydrides for vehicular and other applications" discloses a method of producing Hydrogen using metal hydride which is convenient and safe for transportation. The Magnesium hydride used for Hydrogen production is formed either by combining hydrogen with magnesium metal as shown in reaction (1):

$$Mg(s) + H_2(g) \rightarrow MgH_2(s) \quad (1)$$

Or by adjusting the proportions of Mg and water in the reaction as shown in the reaction (2):

$$2Mg + H_2O \rightarrow MgO + MgH_2 \quad (2)$$

Reaction (1) requires hydrogen already produced by the SMR technique as referred above and based on fossil fuel. Hydrogen is then obtained by heating the hydride or by further reacting with water or other oxides. The patented process for production of hydride is (2) in the invention wherein use of fossil fuel is avoided. However, the cost of production in this process is high due to price of Magnesium. This process also leaves one additional MgO molecule to be recycled.

Magnesium hydride is an excellent hydrogen storage material and can be transported in a powder form or as oil-based slurry. It releases hydrogen on demand without requiring any substantial energy input.

The reaction (2) mentioned above is an exothermic reaction and require no significant energy. However, both the elements Mg and $H_2$ require expensive methods for their extraction from their respective oxide, which is their principal mode of occurrence. There are kinetic problems in the hydrolysis of Mg, but by adjusting the temperature and grain size, such problems are solved.

Krishnan, A, Pal, U. B. and Lu, X. (2005) Solid Oxide Membrane Process for Magnesium Production Directly From Magnesium Oxide, Metallurgical and Materials Transactions B 36(4):463-473 mentions a method for Mg production by electrolytic method using solid oxide membrane as shown below:

$$MgO \rightarrow Mg$$

If the above process does not use coal as a source of energy it can be made emission free while the corresponding process using coal power results in emission of 11.28 kg of $CO_2$ per Kg of Magnesium produced.

The U.S. patent application US20090202413A1 to Saxena relates to a system of processes for sequestering carbon in coal-burning power plant and producing hydrogen gas that take advantage of emission of CO and $CO_2$ and heat from the plants. The use of this invention leads to cheap hydrogen and hydride production and carbon sequestration and reduced global warming.

U.S. patent application 2001/0022960 to Kojima discloses a hydrogen generation method using sodium borohydride solution and metal catalyst coated on metal oxide, wherein the hydrogen generation was accelerated based on the crystal size of the catalyst.

The US patent application US20070025908A1 discloses activated aluminium hydride composition having one or more hydrogen desorption stimulant which includes oxides of metal as metal catalyst for desorption of hydrogen. However, the cost efficiency of Hydrogen production depends on the ratio of the hydride to the stimulant and there is no mention of carbon emission involved in the process.

Therefore, there is a need for a process to produce hydrogen gas from water which is most cost effective and minimizes the resulting emission of carbon. The inventive method disclosed herein addresses such a need by producing hydride from reaction of water with double the amount of magnesium. The extra cost of recycling MgO is adjusted by co-producing a metal which sells for a much higher price than magnesium.

BRIEF SUMMARY OF THE INVENTION

In a preferred embodiment, a method of co-producing hydrogen and metal, the method comprising the steps of: reacting Magnesium hydride and a compound A, selected from a group including metal oxide and metal sulphide, in a fluidized bed reactor wherein the reaction is performed in sealed inert gas flushed reaction chamber and heated between 25° C. and 1000° C.; collecting the hydrogen gas evolved; and collecting and separating the metal and MgO thus produced.

In another preferred embodiment, the method of co-producing hydrogen and metal as described herein, wherein the compound A is at least one from the group consisting of $H_2O$, $SiO_2$, $Al_2O_3$, $Cr_2O_3$, $TiO_2$, $SnO_2$, $ZrO_2$, $CuO$, $CuS$, $CuFeS_2$, $ZnO$, $WO_3$, $Ta_2O_5$, $MnO_2$, $Cs_2Cr_2O_7$ and CsOH.

In another preferred embodiment, an alternative method of co-producing hydrogen and metal, the method comprising the steps of: reacting of a metal P and metal oxide Q with water in a fluidized bed reactor in a sealed inert gas flushed reaction chamber and heating between 25° C. and 1000° C.; collecting the hydrogen gas evolved; and collecting and separating the metal and MgO thus produced.

In another preferred embodiment, the alternative method of coproducing hydrogen and metal as described herein, wherein the metal P is at least one of Magnesium, Calcium, Aluminium or Silicon.

In another preferred embodiment, the alternative method of coproducing hydrogen and metal as described herein, wherein the metal oxide Q is selected from a group consisting of $SiO_2$, $Cr_2O_3$, $TiO_2$, $SnO_2$, $ZrO_2$, $CuO$, $ZnO$, $WO_3$, $Ta_2O_5$, $Cs_2Cr_2O_7$ or CsOH.

In another preferred embodiment, the method of producing hydrogen as described herein, which is free from carbon emission and is highly economical.

In another preferred embodiment, the alternative method of producing hydrogen as described herein, which is carbon emission free and is highly economical.

DETAILED DESCRIPTION OF THE INVENTION

Figure 1:
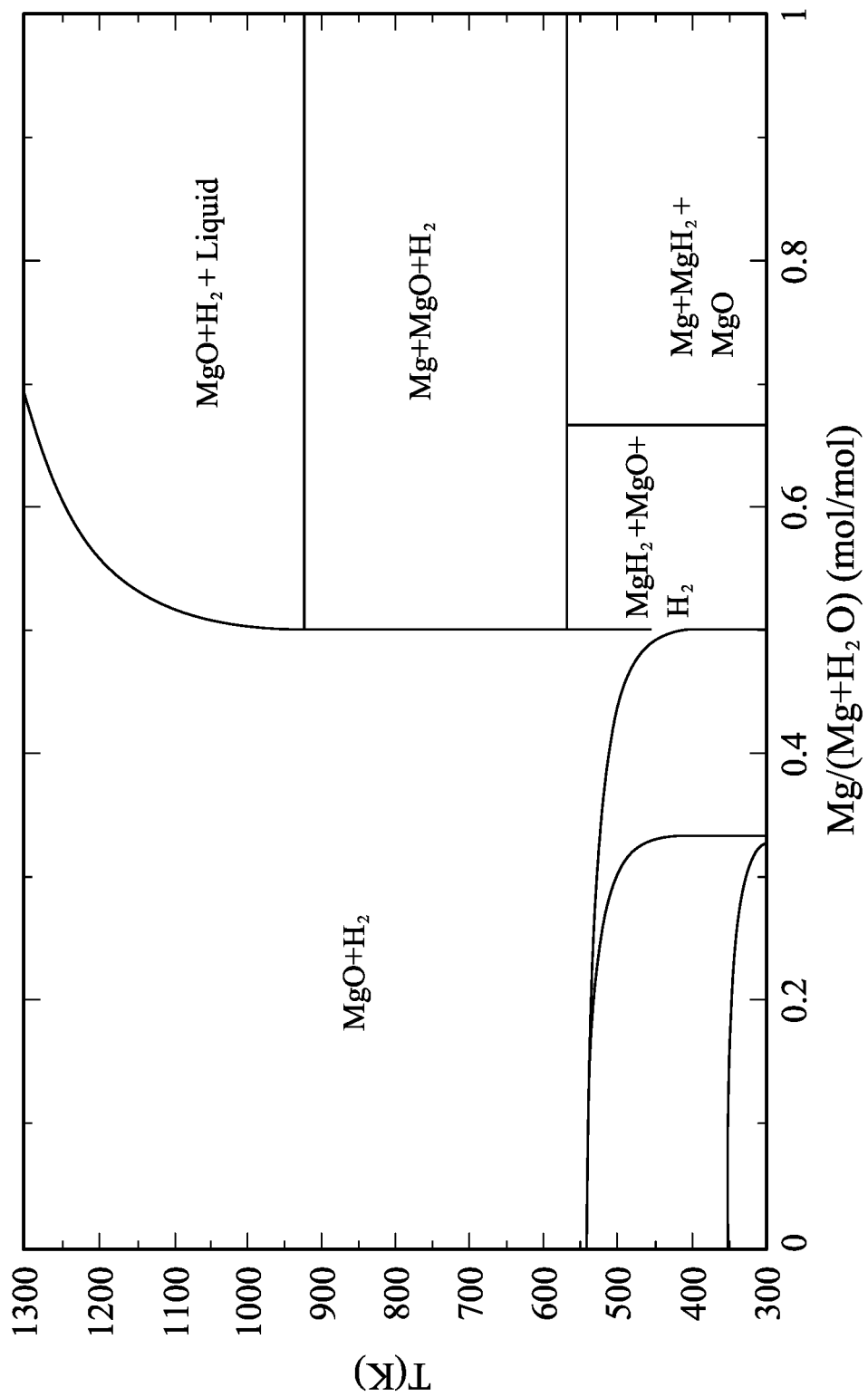
FIG. 1 is a phase diagram depicting the stability of $MgH_2$ formed by combining different proportion of Mg and water at various temperatures.

The present invention is a method of producing hydrogen from water, either via already-produced Magnesium hydride ($MgH_2$) or via a reaction of water and magnesium. Magnesium hydride is a convenient and easily storable solid which contains hydrogen. Hydrogen can be generated by coproducing $MgH_2$ with certain metals. The process is accomplished by reacting Magnesium hydride with a metal oxide or sulfide. Hydrogen can also be coproduced with metal by reaction of a metal such as Mg, Al, Si, or Ca with water and a metal oxide (oxide ore). The coproduction of metals and hydrogen makes hydrogen a by-product and therefore there is no specific cost involved and hence the process is highly profitable. The method is largely carbon emission free depending on mode of production of Magnesium.

The Magnesium required as a reactant in the process is obtained by electrolytic reduction of MgO by the solid oxide membrane (SOM) technique. This process requires close to 12 kWh of electricity and results in the generation of 11.28 kg of $CO_2$ for each kg of Mg when thermal power is used. This emission is reduced to almost zero if alternate forms of energy (hydro, nuclear, solar, wind) are used.

When one mole of Mg reacts with one mole of $H_2$ Magnesium hydride is obtained according to equation (1) shown below:

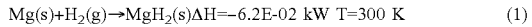
$$Mg(s)+H_2(g) \rightarrow MgH_2(s) \Delta H=-6.2E-02 \text{ kW } T=300 \text{ K} \quad (1)$$

When a metal such as Mg is reacted with water, we get the reaction as shown in (3) and not the hydride producing reaction as shown in (4):

$$Mg+H_2O \rightarrow MgO+H_2 \quad (3)$$

$$Mg+H_2O \rightarrow MgH_2+0.5O_2 \quad (4)$$

The two-step process of reactions (1) and (3) can be changed to one step by using different proportions of Mg and water in reaction (3) to get the following reaction (5):

$$2Mg+H_2O \rightarrow MgH_2+MgO \quad (5)$$

There is an important difference between the hydride produced from reactions (1) and (3) and reaction (5). The hydride in reaction (5) is produced without involvement of any fossil fuel, except if Mg production leads to some carbon emission.

On heating, the hydride produces hydrogen according to equation (6):

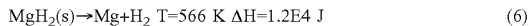
$$MgH_2(s) \rightarrow Mg+H_2 \quad T=566 \text{ K } \Delta H=1.2E4 \text{ J} \quad (6)$$

The price of the hydrogen produced will depend on the price of Mg used in the overall process.

Coproduction of Metal and Hydrogen:

There are two ways of coproducing hydrogen and the metal. The two disclosed methods are as follows:

1. The Hydride Method:

This method to generate hydrogen is to carry the hydride to any site where it is required and apply some heat (reaction 6). $MgH_2$ releases hydrogen on reacting with an oxide, usually with $H_2O$. Other oxides which react with the hydride are CuO or $CuFeS_2$, $Fe_2O_3$, $Fe_3O_4$, $SiO_2$, $SnO_2$, $ZrO_2$, $Al_2O_3$ and $Cr_2O_3$. In each case MgO forms along with hydrogen and the added oxide is reduced to the corresponding metal.

The metals which are produced in the process are very expensive and their production along with hydrogen is very profitable. Further hydrogen being a byproduct is produced at no cost. The overall cost of production is reduced since the recycling cost of MgO will be easily recovered by the sale of the products namely the metal and hydrogen. The reactions of metal oxides with Magnesium Hydride presented below occur at a temperature of 300 K to 400 K. The temperature can be higher if kinetics are slow. All reactions are exothermic except (9). All $\Delta H$ values are in Joules.

$$MgH_2(s)+H_2O \rightarrow MgO+H_2 \Delta H=-2.39E5 \quad (7)$$

$$MgH_2(s)+SiO_2 \rightarrow 0.5Si+0.5Mg2SiO_4+H_2 \Delta H=-1.02E5 \quad (8)$$

$$MgH_2(s)+0.34Al2O_3 \rightarrow MgO+0.68Al+H_2+(minor\ spinel), \Delta H=3.6E4 \quad (9)$$

$$MgH_2(s)+0.34Cr_2O_3 \rightarrow MgO+0.68Cr+H_2+(minor\ spinel), \Delta H=-1.41E5 \quad (10)$$

$$MgH_2(s)+0.5TiO_2 \rightarrow MgO+0.5TiH_2+0.5H_2 \Delta H=-1.25E5 \quad (11)$$

$$(TiH_2=Ti+H2 \Delta H=2e5, T=1155\ K)$$

$$MgH_2(s)+0.5SnO_2 \rightarrow MgO+0.5Sn+H_2 \Delta H=-2.37E5 \quad (12)$$

$$MgH_2+0.5ZrO_2 \rightarrow 0.5ZrH_2+MgO+0.5H_2 \Delta H=-5.41E4 \quad (13)$$

$$(ZrH_2=Zr+H2, T=1139K)$$

$$MgH_2+CuS \rightarrow MgS+Cu+H_2 T=400 \Delta H=-5.8E5 \quad (14)$$

$$MgH_2+CuO \rightarrow MgO+Cu+H_2 T=400 \Delta H=-3.6E5 \quad (15)$$

$$MgH_2+CuFeS_2 \rightarrow FeS+MgS+Cu+H_2 \Delta H=-1.87E5 \quad (16)$$

$$MgH_2+ZnO \rightarrow MgO+Zn+H_2 \Delta H=-1.75E5 \quad (17)$$

$$3MgH_2+WO_3 \rightarrow 3\ MgO+W+3H_2 \Delta H=-7.33E5 \quad (18)$$

$$MgH_2+0.2Ta_2O_5 \rightarrow MgO+0.4Ta+H_2 \Delta H=-1.16E5 \quad (19)$$

$$MnO_2+2MgH_2 \rightarrow 2MgO+Mn+2H_2 \Delta H=-3.6E5 \quad (20)$$

$$7MgH_2+Cs_2Cr_2O_7 \rightarrow 2Cs+7MgO+2Cr+7H_2 \Delta H=-1.59E6 \quad (21)$$

$$MgH_2+CsOH \rightarrow Cs+MgO+1.5H_2 \Delta H=-1.087E5 \quad (22)$$

Reactions (7) to (22) are thermo-chemically possible. The kinetic barrier in these reactions may be overcome by using higher temperatures if needed. Hence, these reactions proceed even in the absence of catalysts.

2. the Direct Method:

In this method metal and hydrogen are produced without the use of hydride by the direct reaction of Metals such as Magnesium, Silicon, Aluminium or Calcium with water and metal-oxide. A few examples of such reactions are as follows:

$$3Mg+SiO_2+H_2O=Si+3MgO+H_2 \Delta H=-6.01E5 \quad (23)$$

(The reaction not useful because Mg is higher in price than Si)

$$2Al+SiO_2+H_2O=Si+Al_2O_3+H_2 \Delta H=-5.23E5 \quad (24)$$

$$4Mg+Cr_2O_3+H_2O=4MgO+2Cr+H_2 \Delta H=-1.04E6 \quad (25)$$

$$3Mg+TiO_2+H_2O=3MgO+TiH_2 \Delta H=-7.47E5 \quad (26)$$

$$2Al+TiO_2+H_2O=Al_2O_3+TiH_2 \Delta H=-5.9E5 \quad (27)$$

$$3Ca+TiO_2+H_2O=3CaO+TiH_2 \Delta H=-8.27E5 \quad (28)$$

$$3Mg+SnO_2+H_2O=3MgO+Sn+H_2 \Delta H=-9.85E5 \quad (29)$$

$$3Ca+SnO_2+H_2O=3CaO+Sn+H_2-1.086E6 \quad (30)$$

$$2Al+SnO_2+H_2O=Al_2O_3+Sn+H_2 \Delta H=-8.62E5 \quad (31)$$

$$Mg+CuO+H2O=2MgO+Cu+H_2 T=400 \Delta H=-8.05E5 \quad (32)$$

$$Ca+CuO+H_2O=2CaO+Cu+H_2 T=400 \Delta H=-8.75E5 \quad (33)$$

$$1.34Al+CuO+H_2O=Cu+0.67Al_2O_3+H_2 \Delta H=-71.19E5 \quad (34)$$

$$1.5Si+SnO_2+H_2O=1.5SiO_2+Sn+H_2 \Delta H=-5.46E5 \quad (35)$$

$$2Mg+0.5ZrO_2+H_2O=0.5ZrH_2+2MgO+0.5H_2 \Delta H=-4.861E4 \quad (36)$$

$$3Ca+ZrO_2+H_2O=3CaO+ZrH_2 \Delta H=-7.35E5 \quad (37)$$

$$2Al+ZrO_2+H_2O=Al_2O_3+ZrH_2 \Delta H=-5.05E5 \quad (38)$$

$$2Mg+ZnO+H_2O=2MgO+Zn+H_2 \Delta H=-6.15E5 \quad (39)$$

$$2Ca+ZnO+H_2O=2CaO+Zn+H_2 \Delta H=-6.77E5 \quad (40)$$

$$1.334Al+ZnO+H_2O=Zn+0.667Al_2O_3+H_2 \Delta H=-5.24E5 \quad (41)$$

$$Si+ZnO+H_2O=Zn+SiO_2+H_2 \Delta H=-3.19E5 \quad (42)$$

$$2Si+WO_3+H_2O=2SiO_2+W+H_2 \Delta H=-7.37E5 \quad (43)$$

$$4Mg+WO_3+H_2O=4MgO+W+H_2 \Delta H=-1.45E6 \quad (44)$$

$$3Al+WO_3+H_2O=1.333Al_2O_3+W+H_2 \Delta H=-1.15E5 \quad (45)$$

$$6Mg+Ta_2O_5+H_2O=6MgO+2Ta+H_2 \Delta H=-1.32E6 \quad (46)$$

$$6Ca+Ta_2O_5+H_2O=6CaO+2Ta+H_2 \Delta H=-1.52E6 \quad (47)$$

$$4Al+Ta_2O_5+H_2O=2Al2O3+2Ta+H_2 \Delta H=-1.064E5 \quad (48)$$

$$4Si+Ta_2O_5+H_2O=3SiO2+Ta_2Si+H2 \Delta H=-5.7E5 \quad (49)$$

$$8Mg+Cs_2Cr_2O_7+H_2O=2Cs+8MgO+2Cr+H_2 \Delta H=-2.48E \quad (50)$$

$$8Ca+Cs_2Cr_2O_7+H_2O=2Cs+8CaO+2Cr+H2 \Delta H=-2.75E6 \quad (51)$$

$$5.5Al+Cs_2Cr_2O_7+H_2O=2Cs+2.67Al_2O_3+2Cr+H_2 \Delta H=-2.14E6 \quad (52)$$

$$5.5Si+Cs_2Cr_2O_7+H_2O=2Cs+4SiO_2+0.75CrSi+0.25Cr_5Si_3+H_2 \quad (53)$$

$$\Delta H=-1.42E6$$

$$Mg+CsOH+H_2O=Cs+MgO+1.5H_2 \Delta H=-1.087E5 \quad (54)$$

$$Si+CsOH+H_2O=Cs+SiO_{2+1.5}H_2 \Delta H=-2.53E5 \quad (55)$$

$$2Ca+CsOH+H_2O=Cs+2CaO+H_2 \Delta H=-6.12E5 \quad (56)$$

$$2Al+CsOH+2H_2O=Cs+Al_2O_3+2.5H_2 \Delta H=-7.75E5 \quad (57)$$

The reactions (23) to (57) are thermo-chemically possible and the kinetic barrier is overcome by the temperature conditions of the reaction. The reactions therefore proceed to completion.

Reactors:

Fluidized bed reactors made of iron-alloy are used for these reactions. The finely ground charge consists of one of the metals including Magnesium, Silicon, Aluminum and Calcium. The metal oxides include $SiO_2$, $Cr_2O_3$, $TiO_2$, $SnO_2$, $ZrO_2$, $CuO$, $ZnO$, $WO_3$, $Ta_2O_5$, $Cs_2Cr_2O_7$ and $CsOH$. The grinding of the charge is done in inert gas sealed metal jars in a planetary ball mill. The reactor is maintained at a homogeneous temperature between 25° C. and 1000° C. All reactions consist of reacting one of the four elements Magnesium, Aluminum, Silicon or Calcium with water and the metal-oxides as mentioned above. The molar proportions of the reactants as shown in the equations are used as the reactant proportion. The detailed design of the reactors may require additional features to remove any difficulties due to the exothermic nature of the reactants.

DETAILED DESCRIPTION OF THE FIGURES

FIG. 1 is a graph depicting the stability of $MgH_2$ formed by combining different proportion of Mg and water at various temperatures. The figure shows that below T=566 K, $MgH_2$ is stable and therefore can be synthesized directly from water and Mg.

Figure 2:
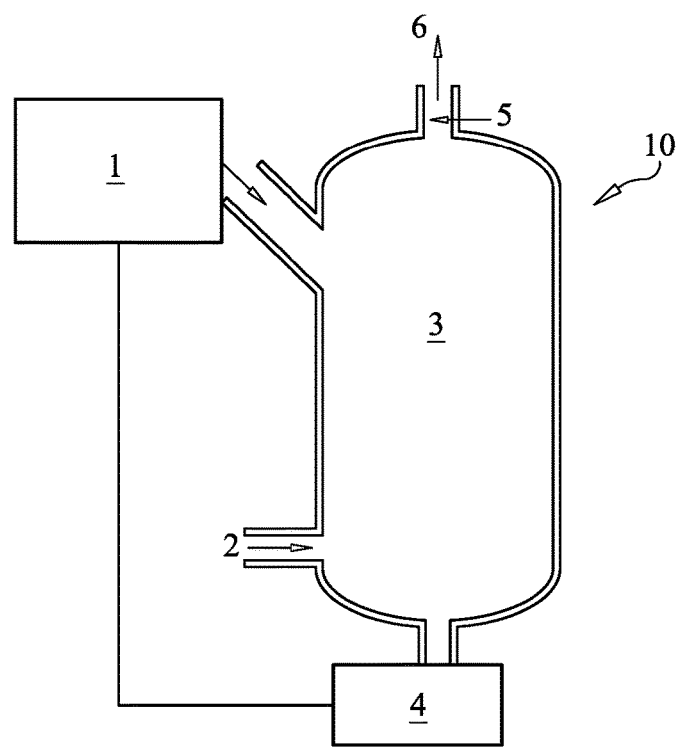
FIG. 2 is a line drawing evidencing a diagram of a reactor used to produce hydrogen from the direct method.

FIG. 2 is a line drawing showing a fluidized bed reactor 10 used to co-produce hydrogen with metal. FIG. 2 shows first inlet 1 of the reactor wherein a mixture of the metal and metal oxide is fed. Hot steam is fed through the second inlet 2. The reaction chamber 3 containing fluidized bed of metal oxide and metal is the place where the reaction takes place. The outlet 4 is where the products MgO and metal are collected. The hydrogen evolved through the anterior outlet 6 is collected for use. The high temperature membrane 5 allows only hydrogen to pass through it preventing the outflow of other undesirable gases.

Figure 3:
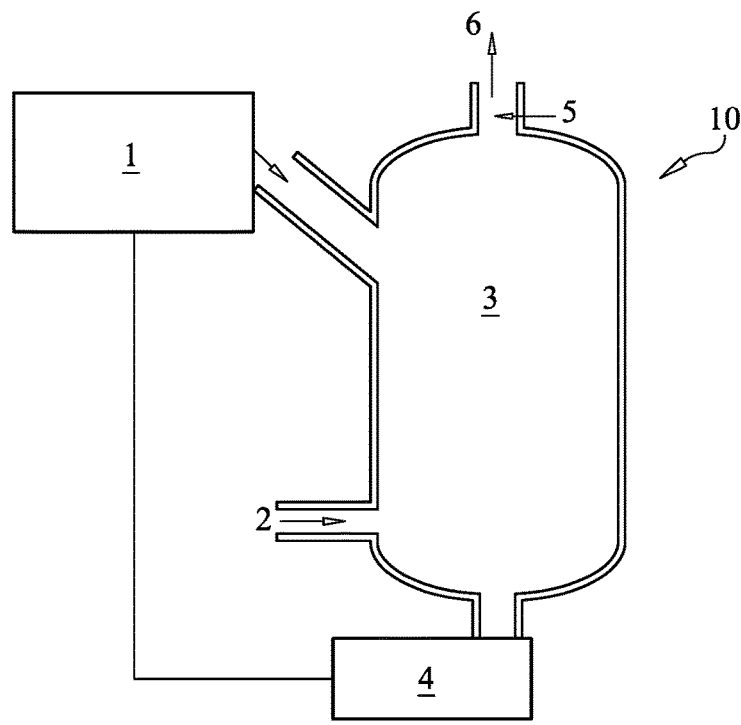
FIG. 3 is a line drawing evidencing an alternate embodiment of the reactor shown in FIG. 2, this time for using the hydride method.

FIG. 3 is a line drawing showing another embodiment of the reactor 10 shown in FIG. 2. The first inlet 1 is used to feed $MgH_2$ and metal oxide. Hot inert gas is fed through second inlet 2. The reaction chamber 3 contains fluidized bed of $MgH_2$, metal oxide and hot inert gas where the reaction takes place. The outlet 4 is used to collect MgO and reduced metal. The hot temperature membrane 5 allows only hydrogen to pass through it. The evolved hydrogen is collected through anterior outlet 6.

Evaluation of the production cost and the sales cost of the obtained products reveal that the overall process is highly cost effective and economically beneficial. The process is very profitable as the price of magnesium used in the reaction is more than offset by the cost of metal obtained as the byproduct.

The present invention is a method of co-producing hydrogen and metal, the method comprises of the steps of reacting Magnesium hydride and metal oxide or Magnesium hydride and metal sulphide in a fluidized bed reactor, collecting the hydrogen gas evolved, collecting and separating the metal and MgO produced. The reaction occurs in a sealed inert gas flushed reaction chamber which is heated between 25° C. and 1000° C.

The metal oxide or metal sulphide used in the process include $H_2O$, $SiO_2$, $Al_2O_3$, $Cr_2O_3$, $TiO_2$, $SnO_2$, $ZrO_2$, CuO, CuS, $CuFeS_2$, ZnO, $WO_3$, $Ta_2O_5$, $MnO_2$, $Cs_2Cr_2O_7$ and CsOH.

The invention also pertains to a method of co-producing hydrogen and metal, the method comprises the steps of reacting a metal and metal oxide with water in a fluidized bed reactor, collecting the hydrogen gas evolved, collecting and separating the metal and MgO. The reaction occurs in a sealed inert gas flushed reaction chamber which is heated between 25° C. and 1000° C.

The metal used in the process is one of Magnesium, Calcium, Aluminium or Silicon. The metal oxide used in the process is one of $SiO_2$, $Cr_2O_3$, $TiO_2$, $SnO_2$, $ZrO_2$, CuO, ZnO, $WO_3$, $Ta_2O_5$, $Cs_2Cr_2O_7$ or CsOH.

An example of the present invention is when tin oxide is added to magnesium hydride it gives us magnesium oxide, tin and hydrogen as in the equation represented below:

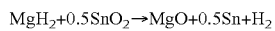

$$MgH_2 + 0.5 SnO_2 \rightarrow MgO + 0.5 Sn + H_2$$

Production cost per mole of $MgH_2$ works to 36-38 dollars by using electrolytic or Steam Methane Reformation method with Solid Oxide Membrane. The produced hydride when reacted with CuS by the hydride method of the invention results in producing hydrogen and copper yielding a net profit of 176 dollars (per mole) in the overall process.

When hydrogen is produced by reacting the hydride with a metal oxide, for some oxides, a kilogram of hydrogen results in production of metals worth many hundred dollars. The calculations are based on the prices of metal and hydride only, costs of oxides and energy are ignored.

In various embodiments of the reaction, production cost using $MgH_2$ and $SiO_2$, $Cr_2O_3$, $TiO_2$, $ZrO_2$ and CsOH as the metal oxide reactant have also revealed the process to be economically beneficial and viable.

The cost analysis of the direct method also indicates that the process is highly profitable and carbon emission free as long as the method of isolating the metal used in the reaction are obtained by using non-fossil sources of energy.

The invention has been explained based on preferred exemplary embodiments without being limited to these exemplary embodiments. The features of individual embodiments can be freely combined with features of other embodiments in order to form new embodiments to the extent compatibility is given. One trained in the art knows numerous deviations and embodiments of the device according to the invention, without here leaving the concept of the invention.

LIST OF REFERENCE NUMERALS 1 first inlet
2 second inlet
3 reaction chamber
4 outlet
5 membrane
6 anterior outlet
10 reactor

I claim:

1. A method of co-producing hydrogen and metal comprising the steps of:
    reacting Magnesium hydride and a compound A, selected from a group consisting of metal oxide and metal sulphide, in a fluidized bed reactor wherein a reaction is performed in sealed inert gas flushed reaction chamber and heated between 25° C. and 1000° C.;
    collecting hydrogen gas evolved; and
    collecting and separating metal and MgO thus produced.

2. The method of co-producing hydrogen and metal of claim 1, wherein the compound A is at least one from the group consisting of $SiO_2$, $Al_2O_3$, $Cr_2O_3$, $TiO_2$, $SnO_2$, $ZrO_2$, CuO, CuS, $CuFeS_2$, ZnO, $WO_3$, $Ta_2O_5$, $MnO_2$, $Cs_2Cr_2O_7$ and CsOH.

3. A method of co-producing hydrogen and metal comprising the steps of:
    reacting a metal P comprising Magnesium and, optionally, one or more of Calcium, Aluminium and Silicon, and metal oxide Q with water in a fluidized bed reactor in a sealed inert gas flushed reaction chamber and heating between 25° C. and 1000° C.;
    collecting hydrogen gas produced; and
    collecting and separating the metal and MgO thus produced.

4. The method of coproducing hydrogen and metal of claim 3, wherein the metal oxide Q is selected from a group consisting of $SiO_2$, $Cr_2O_3$, $TiO_2$, $SnO_2$, $ZrO_2$, CuO, ZnO, $WO_3$, $Ta_2O_5$, $Cs_2Cr_2O_7$ or CsOH.

5. The method of producing hydrogen of claim 1, wherein such method is carbon emission free.

6. The method of producing hydrogen of claim 3, wherein such method is carbon emission free.

7. The method of co-producing hydrogen and metal of claim 2, wherein the reaction is $MgH_2 + 0.5\, SnO_2 = MgO + 0.5\, Sn + H_2$.

* * * * *